US006604462B2

(12) United States Patent
Achelpohl

(10) Patent No.: US 6,604,462 B2
(45) Date of Patent: Aug. 12, 2003

(54) SLEEVE FOR PRESSING ROLLERS

(75) Inventor: Fritz Achelpohl, Lienen (DE)

(73) Assignee: Windmoeller & Hoelscher, Lengrich (DE)

( * ) Notice: Subject to any disclaimer, the term of this patent is extended or adjusted under 35 U.S.C. 154(b) by 0 days.

(21) Appl. No.: 09/820,349

(22) Filed: Mar. 29, 2001

(65) Prior Publication Data

US 2001/0025580 A1 Oct. 4, 2001

(30) Foreign Application Priority Data

Mar. 31, 2000 (DE) ........................................ 100 16 063

(51) Int. Cl.[7] ............................ B41F 5/00; B41F 11/00; B41F 13/00; F16C 13/00; B05C 11/00

(52) U.S. Cl. ........................ 101/216; 101/153; 101/170; 101/128.1; 101/328; 101/375; 492/45; 492/47; 492/48

(58) Field of Search ............................. 101/375, 128.1, 101/216, 328, 153, 170; 428/36.9; 492/45, 47, 48

(56) References Cited

U.S. PATENT DOCUMENTS 4,128,056 A * 12/1978 Vertegaal ................. 101/128.1
5,490,458 A * 2/1996 Stuart ......................... 101/375
5,832,821 A * 11/1998 Peterson et al. ............ 101/216
5,840,386 A * 11/1998 Hatch et al. ............... 428/36.9
5,904,095 A * 5/1999 Nelson ....................... 101/375

FOREIGN PATENT DOCUMENTS

| | | |
|---|---|---|
| DE | 196 13 145 | 10/1997 |
| DE | 197 22 460 | 2/1999 |
| DE | 198 31 694 | 2/1999 |
| JP | 61-272145 | 12/1986 |

* cited by examiner

*Primary Examiner*—Andrew H. Hirshfeld
*Assistant Examiner*—Marvin P Crenshaw
(74) *Attorney, Agent, or Firm*—Jacobson Holman PLLC

(57) ABSTRACT

A sleeve for pressing rollers consists of an internal tube made of expandable material whose inside diameter is adapted to the diameter of the roller that is intended to carrying said material and that is connected with an outer dimensionally stable casing tube. To prevent oscillations of the casing tube that would impair good printing, the latter is provided at its terminal areas with carrying discs or bushings that at least have segments whose boreholes are adapted to the diameter of the roller with a snug fit or a pressing fit.

17 Claims, 2 Drawing Sheets

SLEEVE FOR PRESSING ROLLERS

BACKGROUND OF THE INVENTION

1. Field of the Invention

This invention relates to a sleeve for pressing rollers, preferably for screen rollers of rotary printing machines consisting of an internal, preferably two-layer tube consisting of expandable material, whose inside diameter is adapted to the diameter of the roller intended to carry said material and that is connected with an outer, dimensionally stable casing tube.

2. Description of the Related Art

In printing with a sleeve of this kind, known from DE 196 13 145 Al, it was observed that the printed surfaces displayed shaded areas and/or areas that were smudged in a trembly pattern; this is presumably due to the fact that the casing tube, retained on the inner tube with a certain elasticity and consisting of expandable material, forms a spring-mass system with said casing tube, which system is made to oscillate particularly in the range of natural frequencies.

SUMMARY OF THE INVENTION

The object of the invention therefore is to provide a sleeve of the kind mentioned initially that at all rpm will ensure a good, uniform print without any smudging.

This problem is solved according to the invention in that the casing tube at its terminal areas is provided with carrying discs or bushings that at least have segments whose boreholes are adapted to the diameter of the roller with a snug fit or a pressing fit.

It was now found quite by surprise that the sleeves, designed according to the invention, ensure perfect pressure at all customary roller rpm. This is presumably due to the fact that the casing tube by virtue of the frontal bushings or carrying discs without interjection of the internal tube, in other words, an intermediate layer consisting of elastic material, is connected with the roller so that the elasticity needed for pulling the internal tube upon the roller can no longer introduce any oscillations into the casing tube.

In a practical manner, the casing tube is connected by terminal bushings with the internal tube, where the bushings are provided with blind boreholes into which the carrying discs are fitted. In this design of the invention, the casing tube is connected to the internal elastic widenable tube through the bushing, although in the terminal area of the bushing, there is fitted a carrying disc that connects the casing tube with the roller without the interjection of the internal tube, in other words, without a layer of elastic material inserted in between.

The bushing can have a T-shaped cross-section and the T-bridge is provided with the blind borehole.

The invention-based sleeves are usually pulled on cantilevered rollers. To pull the sleeves up, it is at least required that one layer of the roller be moved so that the sleeve can be pulled on the cantilevered roller. In a practical manner, the internal carrying disc has a larger borehole than the external one so that the internal carrying disc can be pushed almost without any contact over the length of the roller up to a terminal collar of the roller upon which the latter then rests with a snug fit or a pressing fit.

The bushing can be welded together with the casing tube. The carrying disc can be fitted into the borehole of the bushing with a pressing fit or can be connected with it in some other way.

According to another inventive feature, it is provided that the casing tube be connected with the inner tube by means of terminal bushings and that outside-located segments of the bushings in each case rest against the roller with a snug fit or a pressing fit. This embodiment is simplified inasmuch as the casing tube is connected both with the internal tube and the roller only by means of bushings that are made of one part.

In a practical manner, the outer segment of the internal bushing has a larger diameter than the outer segment of the outer bushing. This again makes it simpler to pull the bushing on the roller, something that in a practical manner and in the known fashion is done with compressed air.

The bushings can be connected to the casing tube by means of adhesive connections; furthermore, the bushings can be connected to the internal tube also by means of adhesive connections.

The bushings are usually pulled on by means of compressed air that is supplied through axial and radial boreholes of the roller to the latter's casing. To prevent the compressed air used for pulling up from resulting in a separation of the adhesive connection between the bushings and the internal tube, a further feature of the invention provides that the bushings in each case be provided with ventilation boreholes that bridge the segments with a snug fit or a pressing fit.

An exemplary embodiment of the invention will be explained in greater detail below with the help of the drawings.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
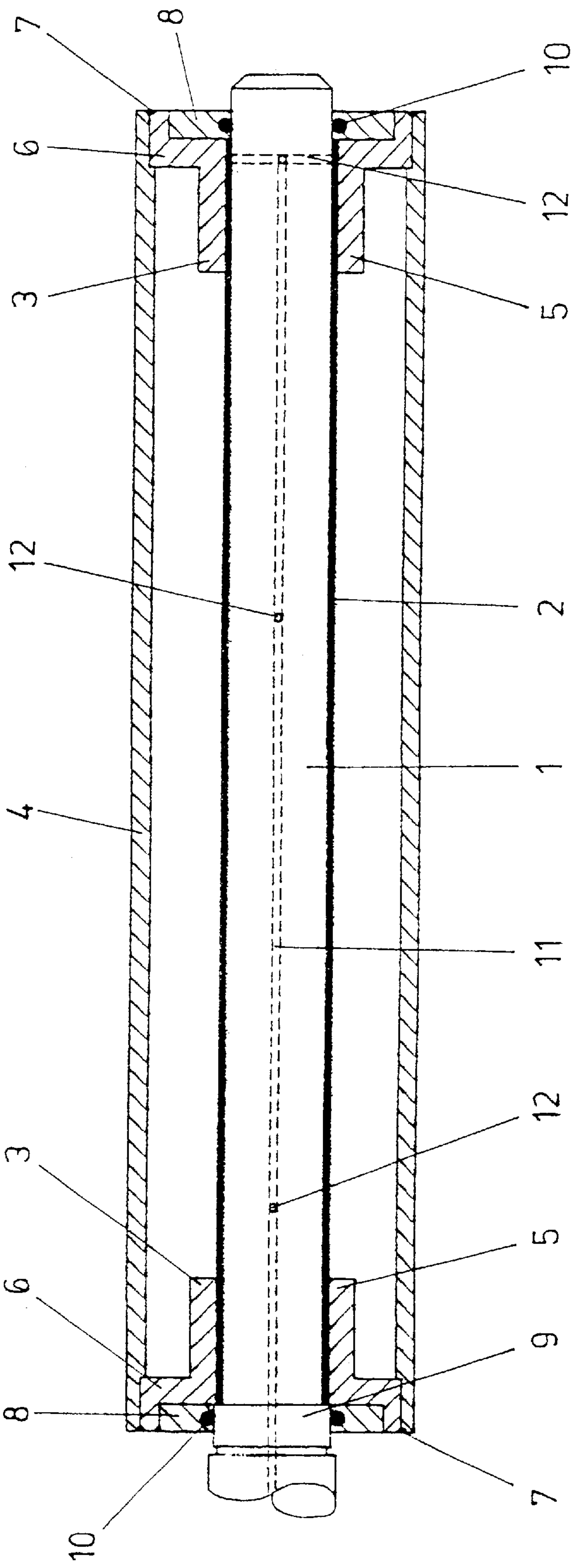
FIG. 1 is a longitudinal profile through a first embodiment of a sleeve that is pulled upon a screen or pressing roller and FIG. 2 is a longitudinal profile through a second embodiment of a sleeve.

FIG. 1 shows the cantilevered roller core 1 of a screen or pressing roller of a rotary printing machine upon which a sleeve is pulled. The sleeve consists of a two-layer internal tube 2, made of elastically expandable material such as it is known, for example, from DE 196 13 145 A1, to which reference is made for a more detailed description of the internal tube. Internal tube 2 is connected by terminal bushings 3 with an external casing tube 4, for example, made of aluminum. Bushings 3 consist of internal tubular segments 5 adjoining which are widened outer segments 6 that in the illustrated fashion are fitted into internal turned grooves of casing tube 4. The widened segments 6 are connected to the casing tube 4 by means of welding connections 7. The widened segments 6 of bushing 3 are provided with flat, blind-hole, turned grooves into which are pressed carrying discs 8. Carrying discs 8 rest directly, in other words, without any intermediate placement of the internal tube 2 on roller core 1. Roller core 1 is provided along its internal terminal area with a collar 9 that has an enlarged diameter and against which rests the left carrying disc 8 with a snug fit or a pressing fit.

At the outer end of the sleeve, carrying disc 8 likewise rests directly with snug fit or pressing fit on roller core 1. Carrying discs 8 are provided along their internal edge with a ring-shaped groove into which is inserted a sealing ring 10.

Roller core 1 is provided with a central compressed-air borehole 11 that is connected with the casing of roller core 1 through radial compressed air boreholes 12. Compressed air is supplied through the compressed air boreholes in the known manner so as to make it easier to push the sleeve upon the roller core.

Figure 2:
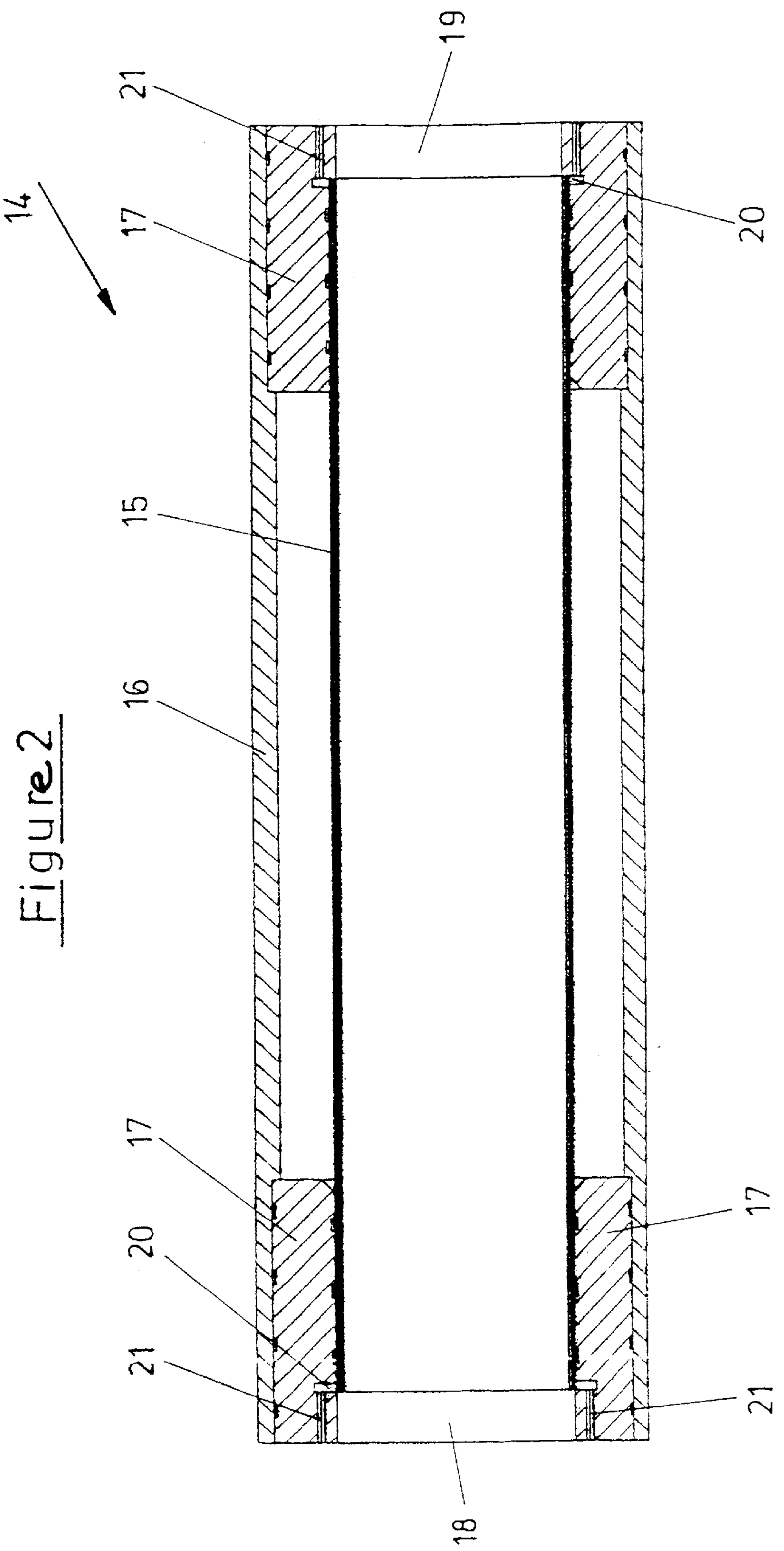

FIG. 2 shows a longitudinal profile through a sleeve 14 such as it can be pulled upon a correspondingly adapted roller core. Sleeve 14 again consists of an internal, two-layer tube 15, for example, of the kind known from DE 196 13 145 A1. Connected via bushings 17 with this internal tube 15 is an external casing tube 16, for example, made of aluminum. Bushings 17 are inserted in the manner shown into internal turned grooves of casing tube 16 and are retained in them by means of gluing. To improve the adhesive connection, bushings 17 are provided along their outer casing with ring-shaped grooves. In a corresponding manner, bushings 17 are also connected with the internal tube 15 by adhesive connections, while the internal walls of bushings 17 are also provided with ring-shaped grooves that retain the adhesive. The outer terminal area of internal bushings 17 is provided with a segment that protrudes over the internal casing tube. With this segment 18, bushings 17 are set with snug fit or pressing fit upon a widened collar of the roller core, not shown.

Outer bushings 17 are provided at their outer end with a segment 19 having a small diameter that likewise does not cover the internal tube 15 and whose diameter corresponds to the diameter of the internal tube 15 so that segment 19 is set directly on the carrying roller core with a snug fit or a pressing fit.

Adjoining segments 18, 19, bushings 17 are provided with radial ring-shaped grooves 20 that are connected by means of axial boreholes 21 with the outer fronts of bushings 17. These grooves 20 and boreholes 21 are used to prevent the penetration of the compressed air used during the time the sleeves are pulled on between the bushings and the internal tube so that the compressed air cannot separate the bushings from the internal tube.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A sleeve for a pressing roller having an outer diameter, comprising:

an internal tube made of expandable material and having an inside diameter substantially corresponding to the outer diameter of said roller over which said material is adapted to be placed;

an outer, dimensionally stable casing tube directly connected to said internal tube through terminal bushings; and carrying discs provided on terminal areas of said casing tube, each carrying disc having a borehole which directly engages said roller outer diameter with a press fit, each of said terminal bushings having a blind borehole into which a respective carrying disc is fitted.

2. The sleeve according to claim 1, wherein each of said bushings has internal tubular segments adjoined with widened outer segments, said internal tubular segments being fixed to said internal tube and substantially parallel with a longitudinal axis of said internal tube, said widened outer segments being fitted into internal turned grooves within said casing tube.

3. The sleeve according to claim 2, wherein said widened outer segments bear said blind borehole.

4. The sleeve according to claim 2, wherein a ring-shaped groove is provided on an internal edge of each of said carrying discs into which a sealing ring is inserted for direct engagement with said roller.

5. The sleeve according to claim 1, wherein said casing tube is welded directly to said bushing.

6. The sleeve according to claim 1, wherein each of said bushings has a T-shaped longitudinal profile, said blind borehole being provided within a T-bridge portion of said bushing.

7. The sleeve according to claim 6, wherein said T-bridge portion is substantially perpendicular to a longitudinal axis of said roller.

8. The sleeve according to claim 1, wherein a ring-shaped groove is provided on an internal edge of each of said carrying discs into which a sealing ring is inserted for direct engagement with said roller.

9. A sleeve for a pressing roller having an outer diameter, comprising:

an internal tube made of expandable material and having an inside diameter substantially corresponding to said roller outer diameter over which said material is adapted to be placed;

an outer, dimensionally stable casing tube connected to said internal tube through bushings provided on terminal areas of said casing tube, each bushing oriented substantially parallel to a longitudinal axis of said roller and having a borehole engaging said roller outer diameter, an outer surface directly adhered to said casing tube, and a segment extending over the terminal area of said casing tube and directly engaging said roller outer diameter with a press fit, said segment having radial ring-shaped grooves connected through axial boreholes with outer fronts of said bushing for passage of air.

10. The sleeve according to claim 9, wherein said outer surface is directly connected to said casing tube with adhesive.

11. The sleeve according to claim 9, wherein each bushing is directly adhered to said internal tube.

12. The combination of a cantilevered roller and an outer sleeve, comprising:

a cantilevered roller core having a diameter and a terminal collar at an inner end thereof;

a removable sleeve having an internal tube and an outer casing tube connected thereto, said internal tube made of expandable material with an inside diameter substantially corresponding to the diameter of said roller core over which said material is adapted to be placed, said outer casing tube being dimensionally stable;

bushings connected to an internal end and an external end of said sleeve, said internal end bushing having a first borehole and said external end bushing having a second borehole, said first borehole being larger than said second borehole so that said internal bushing can be pushed onto a free end of said cantilevered roller core with minimal contact over a length of said roller core up to said terminal collar upon which said internal bushing is pressed with a force fit.

13. The combination according to claim 12, wherein each of said first and second boreholes includes a carrying disc fitted therein.

14. The combination according to claim 13, wherein said carrying discs are pressed into said first and second boreholes with a force fit.

15. The combination according to claim 13, wherein a ring-shaped groove is provided on an internal edge of each of said carrying discs into which a sealing ring is inserted for direct engagement with said roller core.

16. The combination according to claim 10, wherein each of said bushings has internal tubular segments adjoined with widened outer segments, said internal tubular segments being fixed to said internal tube and substantially parallel with a longitudinal axis of said internal tube, said widened outer segments being fitted into internal turned grooves within said casing tube.

17. The combination according to claim 12, wherein ventilation ducts extend from said roller core through said bushings for air passage.

* * * * *